United States Patent [19]

Embury

[11] Patent Number: 4,500,387

[45] Date of Patent: Feb. 19, 1985

[54] LAMINATING APPARATUS WHEREIN SHEETS TO BE BONDED FORM HEATING CHAMBER

[75] Inventor: Lloyd Embury, Islington, Canada

[73] Assignee: Embury Company, Downsview, Canada

[21] Appl. No.: 492,316

[22] Filed: May 6, 1983

[30] Foreign Application Priority Data

Feb. 8, 1983 [CA] Canada .................................... 421096

[51] Int. Cl.³ .............................................. B32B 31/00
[52] U.S. Cl. .................................... 156/499; 156/382;
 156/551; 156/555; 156/559; 156/578
[58] Field of Search ............... 156/285, 286, 324, 382,
 156/499, 551, 555, 578, 322, 307.5, 549, 550,
 549, 497, 559; 428/318.4; 52/309.3, 785, 806,
 309.9, 309.11; 34/154, 159, 161, 203, 205, 209,
 211, 81, 79, 94

[56] References Cited

U.S. PATENT DOCUMENTS

| | | | |
|---|---|---|---|
| 1,759,130 | 5/1930 | Merritt | 34/205 |
| 1,775,130 | 9/1930 | Klein | 34/205 |
| 2,566,249 | 8/1951 | Rainiy et al. | 156/324 |
| 3,751,325 | 8/1973 | Edkvist | 156/550 |

*Primary Examiner*—Marion E. McCamish
*Attorney, Agent, or Firm*—Rogers, Bereskin & Parr

[57] ABSTRACT

A laminating machine for laminating outer sheets one on each side of an inner sheet, in which all three sheets are moved along in alignment, one spaced above the other, with their edges enclosed by adjustable side covers. The side covers together with the top and bottom sheets form a chamber. Contact adhesive is sprayed on the sheets at the entrance to the chamber. Heater bars span the chamber near the entrance to dry the adhesive. A suction box at the other end of the chamber draws air through the entrance, over the adhesive and heater bars, and then exhausts the solvent laden air. Beyond the suction box, pinch rollers compress the three sheets together to laminate them.

8 Claims, 15 Drawing Figures

LAMINATING APPARATUS WHEREIN SHEETS TO BE BONDED FORM HEATING CHAMBER

This invention relates to method and apparatus for laminating sheets of material together.

Laminated materials are commonly used in construction and in industry. For example, laminated aluminum panels, in which thin sheets of aluminum are laminated one on each side of a polyvinyl chloride foam core, are commonly used as cladding in the building industry. However, it has in the past been difficult to produce laminated panels of consistent quality which will have adequate endurance under the severe stresses which they will encounter during a lifetime of service. In addition, it has been difficult to produce laminated panels efficiently and rapidly.

The present invention provides method and apparatus for producing a laminated structure, such as a laminated building panel, in which the laminated structure will be of more uniform and consistent quality and may be produced rapidly and efficiently. Accordingly, in one aspect, the present invention provides a laminating machine for laminating two outer sheets to an inner sheet, all said sheets having the same width, said machine comprising:

(1) means for supporting said outer sheets in spaced apart parallel opposed relation with the side edges of said outer sheets aligned, for travel of said outer sheets together along a direction of travel;

(2) means for supporting said inner sheet between and spaced from said outer sheets and parallel thereto with the side edges of said inner sheet aligned with those of said outer sheet, for travel of said inner sheet along said direction of travel;

(3) motive means for moving all three said sheets in unison along said direction of travel;

(4) side cover means enclosing said side edges of said three sheets to form a chamber, the top and bottom walls of said chamber being constituted by said outer sheets;

(5) means for applying a solvent-containing contact adhesive to said sheets to coat at least some of the opposed surfaces of said sheets for said sheets to be adhered together;

(6) means for providing heat within said chamber to dry said adhesive;

(7) means for exhausting solvent laden air from said chamber, and (8) means to pinch said outer sheets together onto said inner sheet to secure said sheets together.

In another aspect the invention provides a method of laminating two outer sheets to an inner sheet comprising:

(a) moving said sheets along a path of travel with said sheets oriented in opposed, spaced apart, parallel relation with the side edges thereof aligned and with said inner sheet located between said outer sheets, (b) enclosing the side edges of said sheets so that said outer sheets form two surfaces of a chamber with said inner sheet located therebetween, (c) applying a solvent-containing contact adhesive to said sheets to coat at least some of the opposed surfaces of said sheets for said sheets to be adhered together, (d) applying heat within said chamber to dry the solvent from said contact adhesive, (e) exhausting the solvent-laden air from within said chamber, (f) and pinching said outer sheets together, one onto each side of said inner sheet, to laminate said sheets together.

Further objects and advantages of the invention will appear from the following description, taken together with the accompanying drawings in which.

Figures 1, 3, 4, 5, 6:
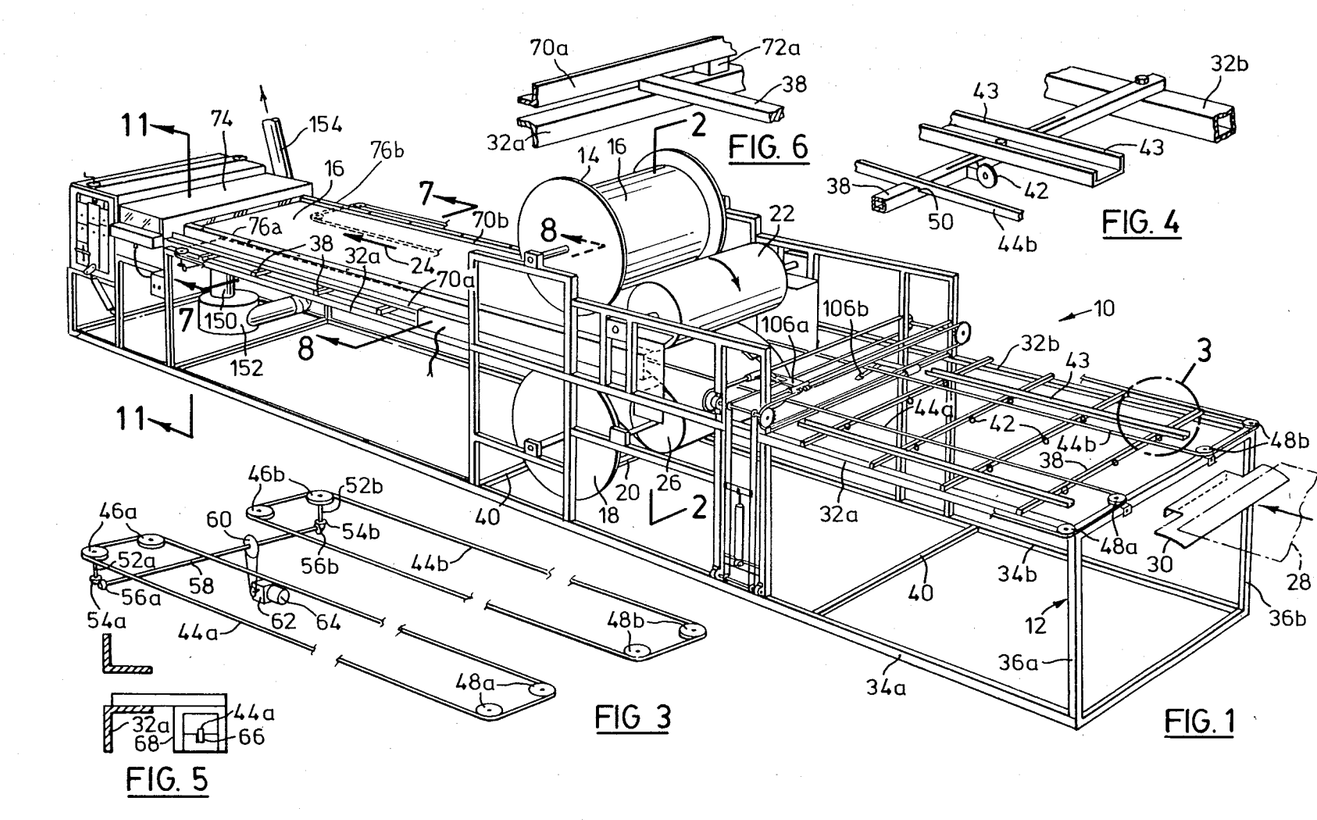
FIG. 1 is a perspective view of a machine for laminating according to the invention.
FIG. 3 is a perspective view of band supporting means of the FIG. 1 machine.
FIG. 4 is a perspective view of roller supporting means and an adjustable side guide of the FIG. 1 machine, taken at circle 4—4 of FIG. 1.
FIG. 5 is a sectional view of band supporting means.
FIG. 6 is a perspective view of a portion of the frame of the FIG. 1 machine.

Reference is first made to FIG. 1, which shows a laminating machine generally indicated at 10, having a fixed frame 12. Mounted on the frame 12 is an upper supply roll 14 which dispenses an upper aluminum sheet 16, and a lower supply roll 18 which dispenses a lower aluminum sheet 20. The upper aluminum sheet 16 is dispensed rearwardly. over an upper idler roller 22 and is then directed forwardly along a direction of travel indicated by arrow 24. The lower aluminum sheet 20 travels rearwardly over a lower idler roller 25 and then travels forwardly again in the direction of arrow 24. The dispensing of the upper and lower aluminum sheets is also shown in FIG. 2.

Figure 2:
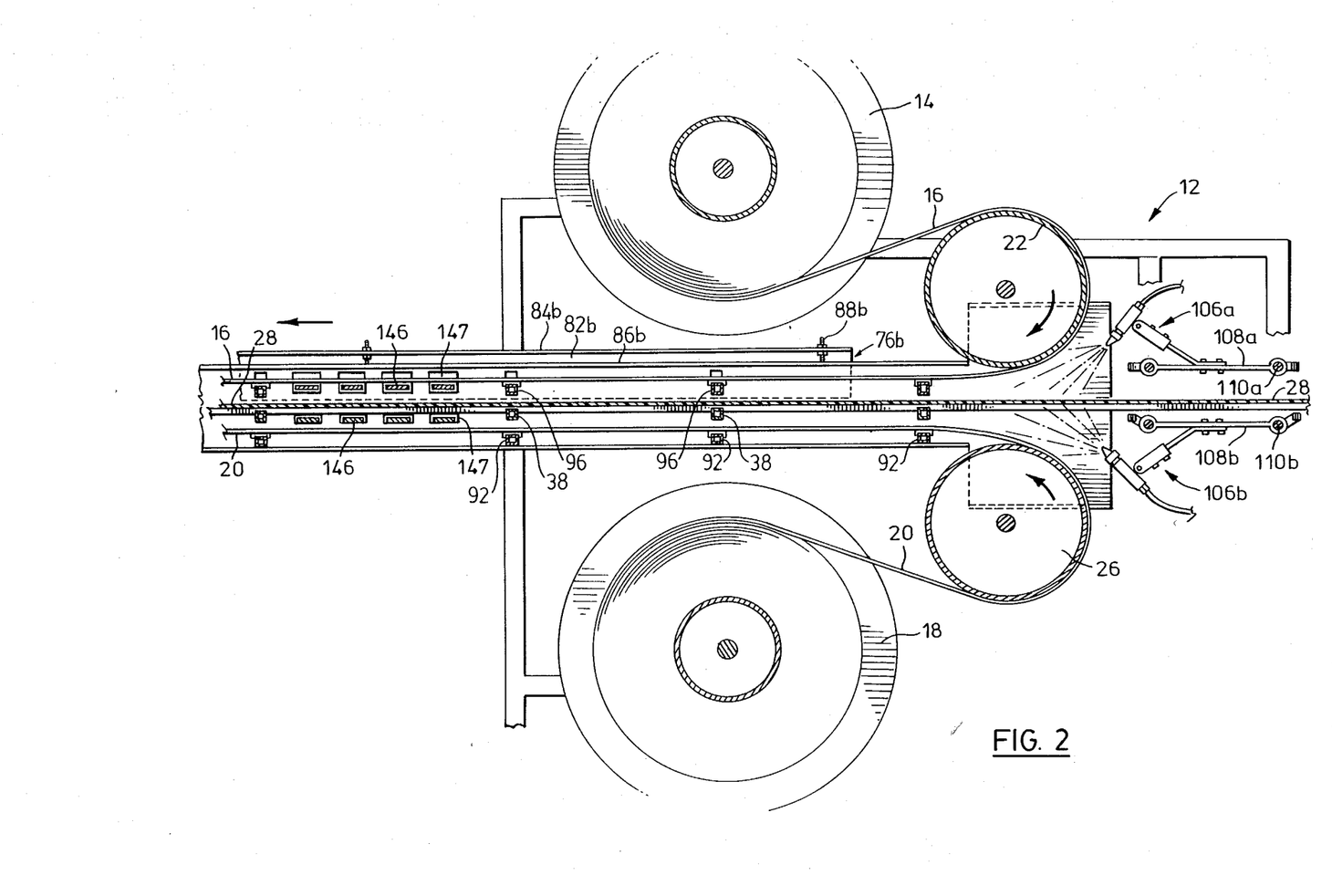
FIG. 2 is a sectional view along lines 2—2 of FIG. 1.

As also shown in FIGS. 1 and 2, a foam inner core or sheet 28 is fed over a guide lip 30 fastened to the frame 12 and is then fed between the upper and lower aluminum sheets 16, 20. The foam sheet 28 may be of any suitable material, e.g. polyvinyl chloride foam, and is fed by any desired means, either manually or by a separate dispenser. The supply rolls 14, 18 and the foam sheet 28 are located so that the side edges of all three sheets (which are of the same width) are aligned one above the other.

The frame 12 includes fixed upper and lower longitudinal members 32a, 32b, 34a, 34b. The upper and lower members 32a, 34a and 32b, 34b are held together by vertical members 36a, 36b and by upper and lower laterally extending cross bars 38, 40. The frame 12 thus has an open box-like appearance, as shown.

The foam inner sheet 28 is supported on the upper cross bars 38 by rollers 42 mounted thereon. The rollers are typically formed of the low friction plastic sold under the trade mark TEFLON. Side guides 43 adjustably mounted on the cross bars 38 guide the edges of the foam sheet 28 as such sheet is fed toward the supply rolls 14, 18.

The foam inner sheet 28 is further supported and is also transported by a pair of endless steel bands shown at 44a, 44b in FIGS. 1 and 3. Each band 44a, 44b travels longitudinally nearly the entire length of the frame, and extends around pulleys 46a, 48a, or 46b, 48b at each end of the machine. The bands 44a, 44b are supported and guided by notches 50 (see FIGS. 4 and 5) formed in the upper cross bars 38. As shown in FIG. 3, the outer pulleys 46a, 46b have shafts 52, 52b depending therefrom, containing at their ends bevelled gears 54a, 54b which mesh with corresponding bevelled gears 56a, 56b on a cross shaft 58. The cross shaft 58 is driven by a pulley 60 from a gear box 62 and electric motor 64.

On their return travel, the bands 44a, 44b are supported and guided by notches 66 (FIG. 5) cut in support brackets 68 mounted on and projecting outwardly from the upper frame members 32a, 32b.

Figure 7:
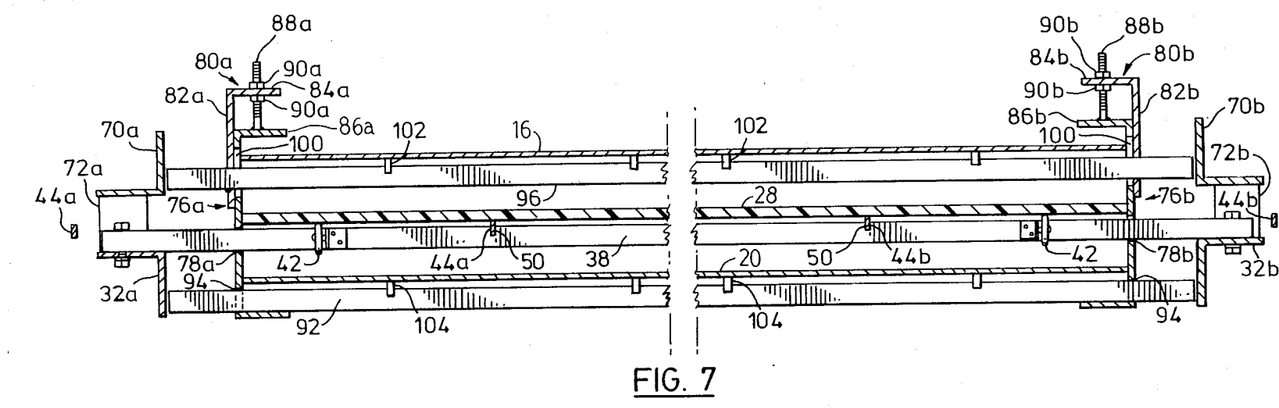
FIG. 7 is a sectional view taken along lines 7—7 of FIG. 1.

With reference now to FIGS. 1, 6 and 7, it will be seen that the portion of the upper frame located downstream of the supply rolls 14, 18 is of special construction. Specifically, mounted above each upper frame member 32a, 32b is a second upper frame member 70a, 70b. The frame members 70a, 70b are supported on frame members 32a, 32b by spacer blocks 72a, 72b (FIG. 6) and extend from the supply rolls 14, 18 to a suction box 74 (to be described). The second upper frame members 70a, 70b are for a purpose which will be indicated shortly.

The cross bars 38 located between the supply rolls 14, 18 and the suction box 74 carry two side covers 76a, 76b. The side covers 76a, 76b have openings 78a, 78b therein so that they fit snugly on but are slidable laterally on cross bars 38.

Each side cover 76a, 76b includes an upper separate L-shaped section 80a, 80b having a side flange 82a, 82b which overlies the side of its side cover 76a, 76b, and having an inturned top flange 84a, 84b which overlies and is spaced above an inturned top flange 86a, 86b of the side cover 76a, 76b. The two top flanges 84a, 86b and 84b, 86b are connected together by bolts 88a, 88b welded to flanges 86a, 86b and extending upwardly through flanges 84a, 84b and secured by nuts 90a, 90b.

The side covers 76a, 76b support lower sliding cross bars 92 which extend through relatively snugly fitting openings 94 in the covers and essentially abut (with a slight clearance) the frame members 32a, 32b. The side covers 76a, 76b also support upper sliding cross bars 96 which extend through relatively snugly fitting openings 98 in side flanges 82a, 82b and through vertically enlarged openings 100 in the sides of side covers 76a, 76b. The upper sliding cross bars 96 abut (with a slight clearance) the second upper frame members 70a, 70b.

The arrangement described allows the side covers 76a, 76b to be moved laterally inwardly or outwardly dependent on the width of the aluminum and foam sheets 16, 20, 28 being laminated. The "sliding" upper or lower cross bars themselves do not move laterally, since they are constrained by the frame members 32a, 32b, 70a, 70b. In addition the height of the upper sliding cross bar 96 can be adjusted by turning the bolts 88a, 88b dependent on the thickness of the foam sheet 28. In use the side covers 76a, 76b are adjusted so that the space between them is very slightly greater than the width of the sheets being laminated. Threaded crossbars (not shown) may also be inserted between the covers 76a, 76b at their tops and bottoms and extending to the frame members 32a, 32b, 70a, 70b, to hold the covers rigidly with a small clearance from the edges of the sheets being laminated.

The upper aluminum sheet 16 is supported (see FIG. 7) by thin plastic inserts 102 (e.g. made of the plastic known under the trade mark TEFLON) inserted in slots in the upper sliding cross bar 96. The lower aluminum sheet 20 is similarly supported by similar thin plastic inserts 104 in the lower sliding cross bar 92.

Figures 9, 10:
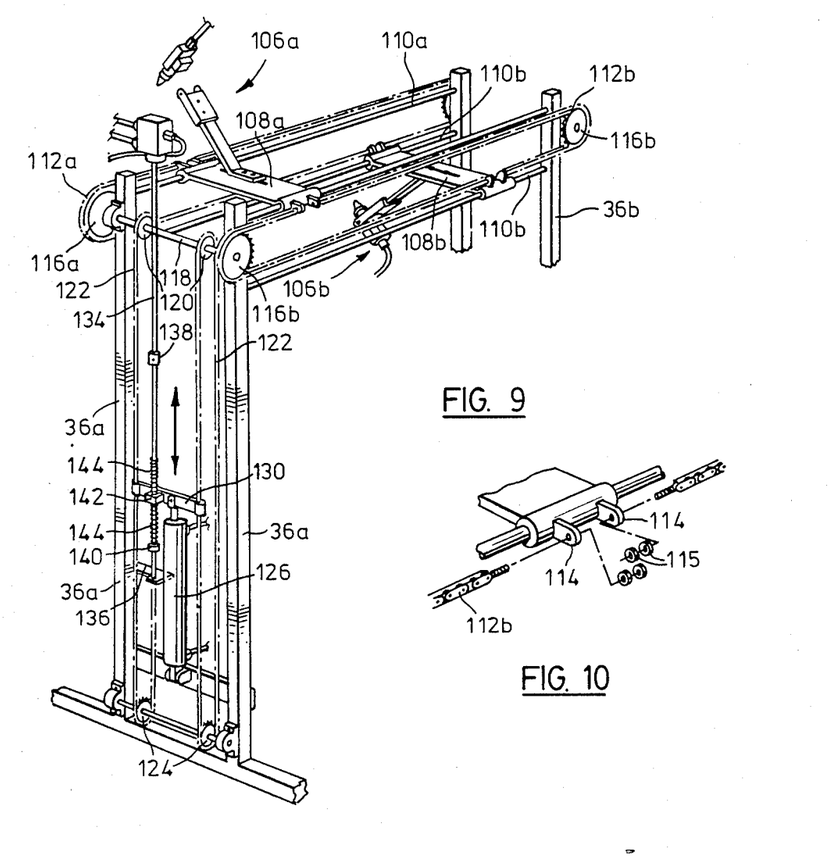
FIG. 9 is a perspective view showing spraying apparatus of the FIG. 1 machine.
FIG. 10 shows details of a portion of FIG. 9.

It will be seen that the upper and lower aluminum sheets 16, 20 together with the side covers 76a, 76b form an enclosed chamber within which the foam sheet 28 travels. At the entrance to the chamber, as shown in FIGS. 1, 2 and 9, a suitable adhesive (such as urethane contact adhesive) is sprayed on the inner surfaces of both the aluminum sheets 16, 20 and on both surfaces of the foam sheet 28 by a pair of reciprocating spray guns 106a, 106b. Each spray gun 106a, 106b is mounted on a traverse frame 108a, 108b. The traverse frames 108a, 108b are guided for reciprocating movement across the machine by pairs of guide rods 110a, 110b extending between the vertical frame members 36a, 36b. Each traverse frame member is connected on each side thereof to an endless chain 112a, 112b (FIG. 9) by means of lugs 114 and nuts 115 (FIG. 10).

The chains 112a, 112b travel around opposed sprockets 116a, 116b on each side of the machine 10. The sprockets 116a are connected together by a rod 118 containing sprockets 120 around which pass a pair of vertically extending endless chains 122. The chains 122 pass around lower sprockets 124 and are driven in a reciprocating vertical movement by a pneumatic drive cylinder 126. The cylinder 126 has its piston rod 128 connected to a cross bar 130 which is connected at each end to the chains 122. The air for the drive cylinder 126 and also for the spray guns 106a, 106b is supplied to a valve 132 which is controlled by a vertically oriented operating rod 134 guided by a bracket 136 mounted on a vertical frame member 36a. The rod 134 contains upper and lower stops 138, 140. The drive cylinder cross bar 130 contains a lug 142 through which rod 134 passes, with coil springs 144 encircling rod 134 above and below the lug 142. Thus, as the drive cylinder piston rod 128 moves up and down, the springs 144 press against the stops 138, 140 and operate the air valve 132 to reverse the direction of movement of the drive cylinder. The springs 138, 140 operate as shock absorbers. This arrangement causes the adjustable spray guns 106a, 106b to reciprocate back and forth at about one stroke per second, spraying contact adhesive on the inner surfaces of the aluminum sheets 16, 20 and on both sides of the foam sheet 28 as mentioned.

Figure 8:
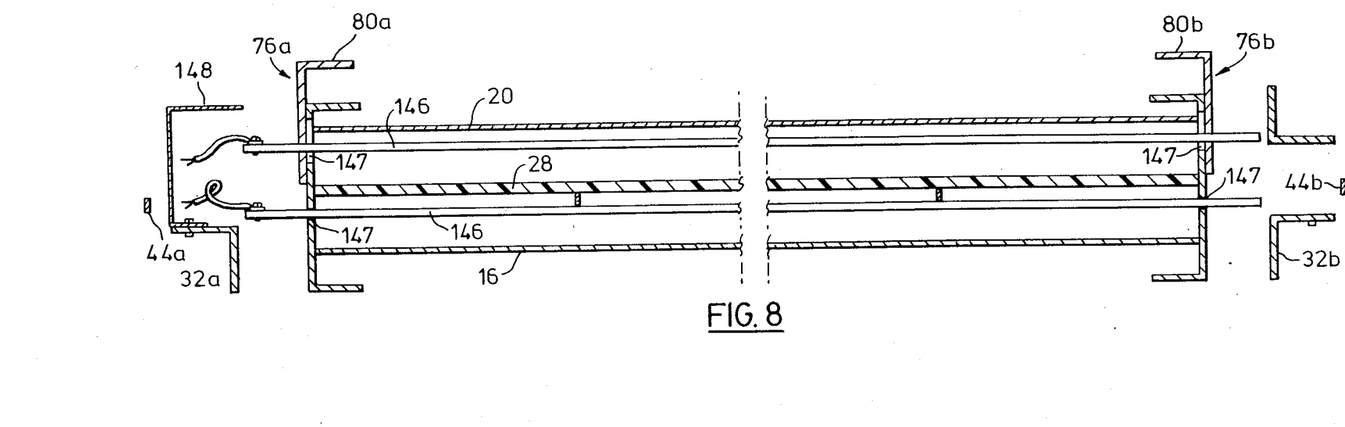
FIG. 8 is a sectional view taken along lines 8—8 of FIG. 1.

The wet adhesive on the aluminum and foam sheets is dried by heat supplied from a set of transverse heater bars 146 best shown in FIGS. 2 and 8. As shown, the heater bars 146 extend through slots 147 in the side covers 76a, 76b but are not fixed thereto so that the side covers may be slid laterally with respect to the heater bars. Typically eight heater bars 146 are used, each of about 1,000 watts capacity, to provide sufficient heat to evaporate the solvents used in the contact adhesive. As shown the heater bars 146 extend between each aluminum sheet 16, 20 and the inner foam sheet 28 and are located adjacent the upstream end of the chamber formed by the aluminum sheets and the side covers. The upper heater bars will, as shown, move up and down as the L-shaped sections 80a, 80b are moved up and down. At one side of the machine the second upper frame member 70a is interrupted at the location of the heater bars and replaced by a cover 148, to allow access to the heater bars and their terminals.

At the downstream end of the chamber formed by aluminum sheets 16, 20 and side covers 76a, 76b, the suction box 74 serves to draw air into the upstream end or entrance of the chamber, past the heater bars 146, and then out through an exhaust pipe 150 (FIG. 1) The hot air flow over the adhesive coated surfaces dries the adhesive. A high speed blower 152 draws the solvent laden air from pipe 150 and expels it through a duct 154 to an appropriate air cleaner or solvent recovery system, or to atmosphere. When the sheets reach suction box 74, the contact adhesive at this location is now sufficiently dry that the sheets are ready to be pressed together.

Figure 11:
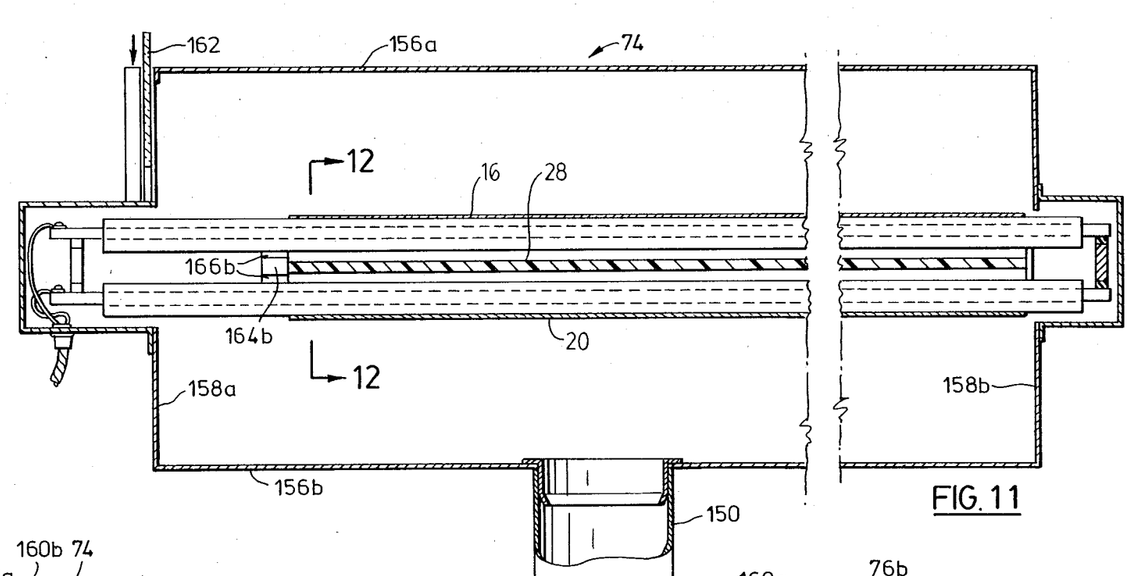
FIG. 11 is a sectional view along lines 11—11 of FIG. 1.
Figure 12:
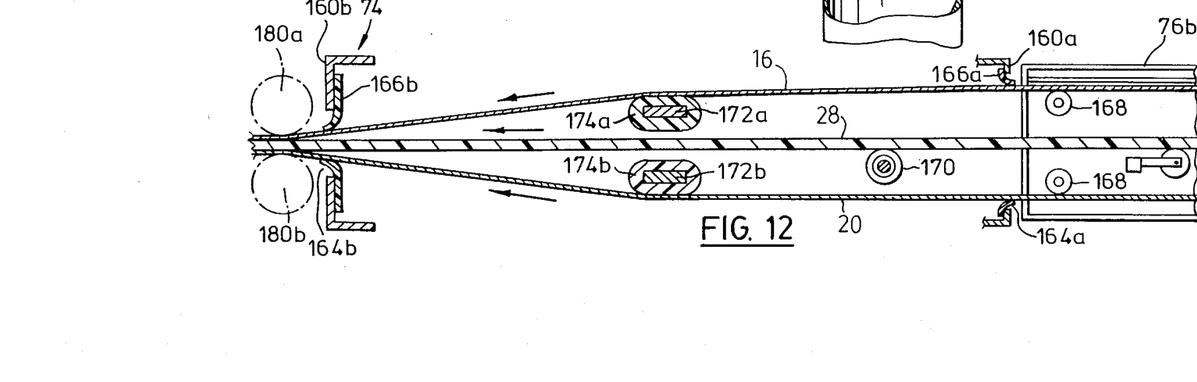
FIG. 12 is a sectional view along lines 12—12 of FIG. 11.

As shown in FIGS. 11 and 12, the suction box 74 includes upper and lower walls 156a, 156b, side walls 158a, 158b and end walls 160a, 160b. One side wall 158a contains a removable glass viewing panel 126 so that the alignment of the sheets within can be viewed by a person setting up the machine and for access to the inside of the suction box 74. The end walls 160a, 160b contain openings 164a, 164b through which the sheets 16, 20, 28 may pass, the openings being at least partly sealed by rubber flaps 166a, 166b. The aluminum sheets 16, 20 are forced against the flaps 166a by full width rollers 168 which can at this point press against the inner surfaces of aluminum sheets 16, 20 since the contact adhesive is essentially dry at this portion.

Located within the suction box 74 are several narrow laterally spaced support rollers 170 mounted on a cross bar (not shown) to support the foam sheet 28 as it travels through the suction box 74.

The suction box 74 also includes a pair of heater bars 172a, 172b thickly coated with heat resistent low friction plastic such as that sold under the trade mark TEFLON. The plastic coating is indicated at 174a, 174b. The upper aluminum sheet 16 slides over and is supported by the upper heater bar 172a and the lower aluminum sheet 20 slides over and is guided by the lower heater bar 172b. The aluminum sheets and foam inner sheet then exit through opening 164b from the suction box and converge between a pair of pinch rollers 180a, 180b which will now be described.

Figure 13:
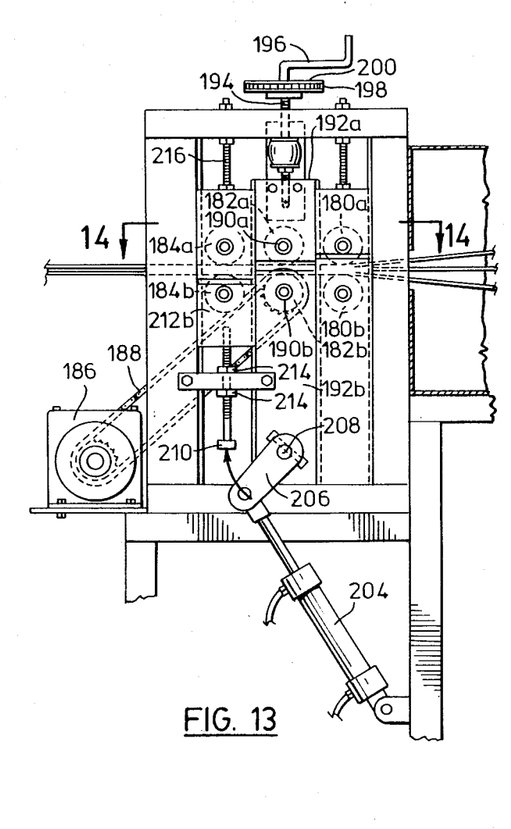
FIG. 13 shows details of the pinch roll arrangement of the FIG. 1 machine.
Figures 14, 15:
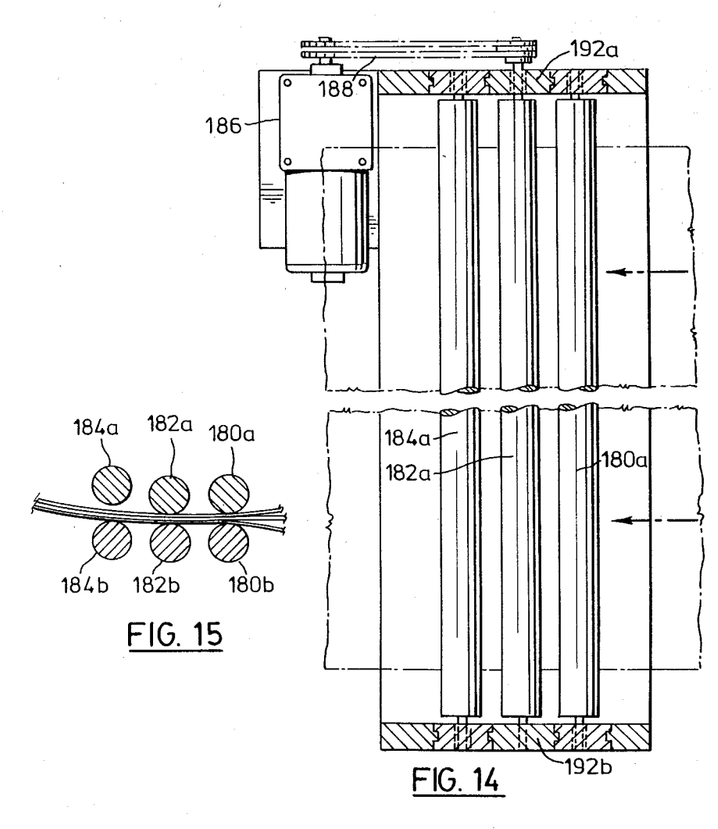
FIG. 14 is a sectional view taken along lines 14—14 of FIG. 13.
FIG. 15 shows further details of the pinch roll arrangement.

As shown in FIGS. 13 to 15, three pairs of opposed pinch rollers 180a, 180b, 182a, 182b, 184a, 184b are provided. Only the central pair 182a, 182b is powered, driven by a gearbox and motor 186 and a chain 188. This provides the entire drive for the aluminum sheets 16, 20 and also pulls the foam sheet 28 (which may be in individual sections rather than being continuous). The remaining pinch rollers act as idlers.

When the laminated product to be formed is to be straight and flat, then the pinch rollers are all arranged in a straight line as shown in FIG. 13. Pressure on the central pair of driven pinch rollers 182a, 182b is provided as follows. Each pinch roller 182a, 182b is mounted on a shaft 190a, 190b journalled in a block 192a, 192b. The blocks 192a, 192b are connected together by tongues and grooves with the corresponding blocks of the other pinch rollers as shown in FIG. 14. The upper central blocks 192a each have a vertical rod 194 threaded therein, with a crank handle 196 at the end of one of the rods 194. A chain 198 encircles corresponding sprockets 200 on the rods 194. When the crank handle 196 is turned couner clockwise, the rod 194 will attempt to rise, but this is prevented by a rubber block 202 which abuts an upper upper frame member 204 of the pinch rollers. Further cranking causes the pinch roller block 192a to be driven resiliently downwards against the compression of the rubber block 202. A "resilient" pressure is therefore applied to the pinch roller 182a. The pressure is uniform at each end of the pinch roller 182a because of the chain 198. Similar roller blocks (not shown) may be used for the other pinch rollers.

If it is desired to produce a curved laminated product, then a cylinder 204 (FIG. 13) is actuated to drive arm 206 clockwise about shaft 208. Arm 206 contacts a rod 210 projecting from the bottom of the end pinch roller mounting block 212b, forcing this block slightly upwardly to move the end lower pinch roller 184b to the position shown in FIG. 15. Nuts 214 are first loosened to allow this process. At the same time, bolt 216 is operated to lift the upper end pinch roller 184a out of the way. The curved arrangement of the pinch rollers shown in FIG. 15 then produces a continuously curved laminated sheet (which of course is cut into discrete lengths by any appropriate cutting means). There is a duplicate of cylinder arm 206 (not shown) at the far side of the machine 10, also mounted on shaft 208 to turn with arm 206.

If the polyvinyl chloride foam core sheet 28 is supplied from a roll, then if desired, three horizontally aligned sets of steel pinch rollers (not shown) heated to a suitable temperature may be used to remove any memory from the core sheet 28 and to ensure that sheet 28 is flat, before sheet 28 enters between the outer sheets 16, 20.

I claim:

1. A laminating machine for laminating two outer sheets to an inner sheet, all said sheets having the same width, said machine comprising:
    (1) means for supporting said outer sheets in spaced apart parallel opposed relation with the side edges of said outer sheets aligned, for travel of said outer sheets together along a direction of travel;
    (2) means for supporting said inner sheet between and spaced from said outer sheets and parallel thereto with the side edges of said inner sheet aligned with those of said outer sheet, for travel of said inner sheet along said direction of travel;
    (3) motive means for moving all three said sheets in unison along said direction of travel;
    (4) side cover means enclosing said side edges of said three sheets to form a chamber, the top and bottom walls of said chamber being constituted by such moving outer sheets;
    (5) means for applying a solvent-containing contact adhesive to said sheets to coat at least some of the opposed surfaces of said sheets for said sheets to be adhered together;
    (6) means for providing heat within said chamber to dry said adhesive;
    (7) means for exhausting solvent laden air from said chamber, and
    (8) means to pinch said outer sheets together onto said inner sheet to secure said sheets together.

2. A machine according to claim 1 wherein said means for applying adhesive comprises spray means located adjacent one end of said chamber and said means for exhausting air is located adjacent the other end of said chamber.

3. A machine according to claim 2 wherein said means for providing heat is located adjacent said one end of said chamber.

4. A machine according to claim 2 wherein said means for applying heat includes a set of heater bars located within said chamber adjacent said one end thereof and extending laterally across said chamber.

5. A machine according to claim 1 (wherein said means for exhausting air includes a suction box having a pair of heater bars therein, said heater bars being spaced apart, means for guiding one of said outer sheets over one of said heater bars, means for guiding the other outer sheet over the other heater bar, and guide means for guiding said inner sheet between said heater bars.

6. A machine according to claim 1 wherein said means for supporting said inner sheet comprises two thin metal bands, said motive means including means for moving said bands along said predetermined path, said bands being oriented to support said inner sheet on the edges of said bands so that only a minimum portion of the surface area of said inner sheet will be obstructed from application of adhesive by said bands.

7. A machine according to claim 1 wherein said side cover means comprises a pair of side covers, cross-bar means extending laterally across said path of travel and supporting said side covers, said side covers being movable inwardly and outwardly on said cross-bar means for adjustment of the width of said chamber dependent on the width of said sheets.

8. A machine according to claim 1 wherein said cover means comprises a pair of side covers, a plurality of central cross-bars extending laterally across said path of travel and supporting said side covers, said side covers being movable inwardly and outwardly on said central cross bars for adjustment of the width of said chamber dependent on the width of said sheets, and said means for supporting said outer sheets comprises a plurality of upper cross-bars supported by and extending through said side covers for supporting one of said outer sheets and a plurality of lower cross bars supported by and extending through said side covers supporting the other of said outer sheets.

* * * * *